Jan. 14, 1936.  R. R. RIDGWAY ET AL  2,027,786
METHOD OF MAKING BORON CARBIDE ARTICLES
Filed Oct. 20, 1933
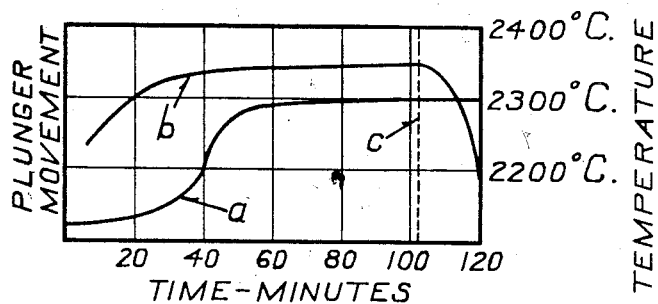
FIG. 4
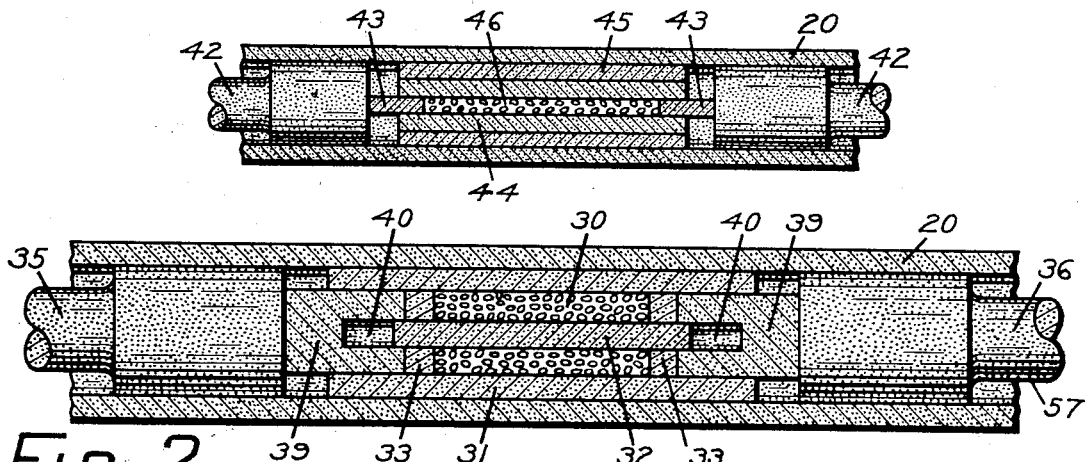
FIG. 3
FIG. 2
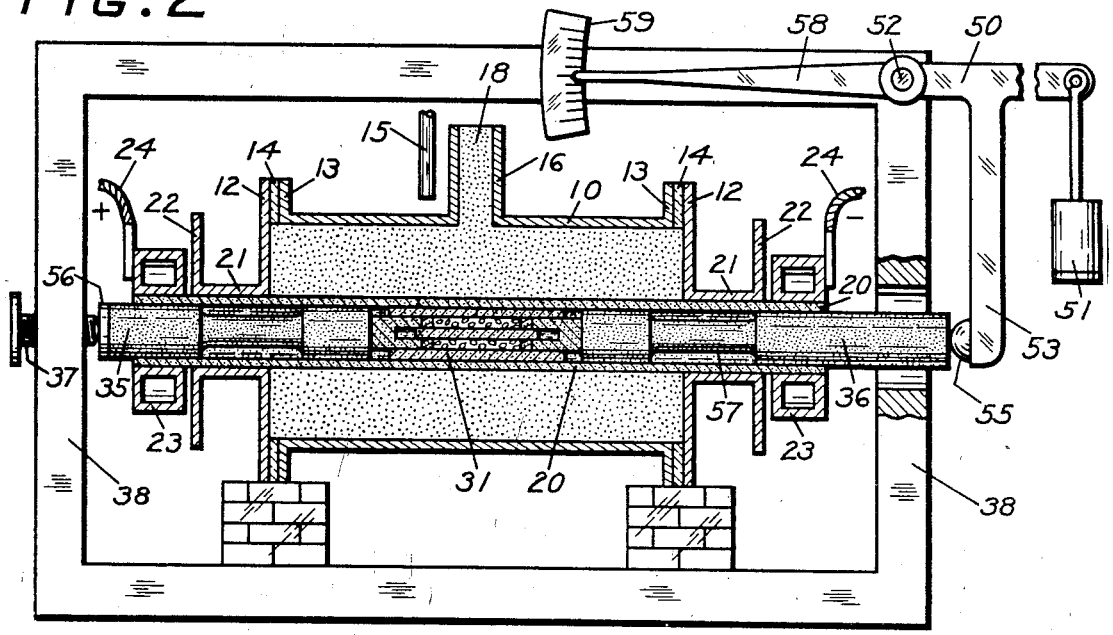
FIG. 1
Inventors
RAYMOND R. RIDGWAY
BRUCE L. BAILEY
WITNESSES
Franklin E. Johnson
Lois M. Keemie
By Clayton L. Jenks
Attorney Patented Jan. 14, 1936

2,027,786

UNITED STATES PATENT OFFICE 2,027,786

METHOD OF MAKING BORON CARBIDE ARTICLES

Raymond R. Ridgway and Bruce L. Bailey, Niagara Falls, N. Y., assignors to Norton Company, Worcester, Mass., a corporation of Massachusetts Application October 20, 1933, Serial No. 694,502

15 Claims. (Cl. 13—23)

This invention relates to shaped articles of boron carbide and to a method of making such articles.

The patent to Ridgway No. 1,897,214 describes boron carbide of the formula $B_4C$ and a method of making this material, which is characterized by a conchoidal crystalline fracture and appears as a continuous single phase and without intergranular weakness. This material, as described, is substantially free from uncombined boron and uncombined carbon in the form of graphite, as well as significant amounts of silicon, iron and aluminum. It has a melting point of about $2400° \pm 50°$ C., and probably melts at about 2375° C., as measured by optical methods. This material is very stable and is not decomposed by heat. It melts to a liquid phase without change in composition due to volatilization and is capable of being crystallized from the molten condition.

In the course of our experimentation, we have found that boron carbide is particularly well adapted for various industrial uses where its hardness and continuity of structure are essential characteristics, but in which it is required that the material be molded to a definite shape. As examples of such uses, it will serve as a bearing, a sandblast nozzle, a wire drawing die or a steadyrest shoe. For example, a wire drawing die must be made to accurate dimensions of a material which will not materially change in size for a considerable time under the severe conditions of wire drawing which involve high friction, heat and pressure. Likewise, the bore of a blasting nozzle must withstand the abrasion of a fast moving stream of very hard cutting abrasives, such as granular crystalline alumina and silicon carbide. A bearing, on the other hand, requires not only a hard surface but particularly one which has a high polish and a very smooth surface. In each of these cases, it is necessary that the operative face of the article be made up of a substantially continuous single phase of crystalline boron carbide which is devoid of parting planes of graphite and other undesired impurities, such as the borides and carbides of iron, aluminum and silicon, which weaken the material and lessen its resistance to abrasion or wear. The surface is often required in a highly polished state, in which its continuity and density of structure are highly important.

Boron carbide of the formula $B_4C$ is harder than the standard cutting tools, as well as crystalline alumina and silicon carbide, and it is only slightly below the diamond on the scale of hardness; hence, it is extremely difficult and expensive to shape an article of boron carbide by the ordinary cutting and grinding methods. It is, therefore, desirable to shape the article by a casting or molding process. Although the material melts readily without loss of volatilization and can be shaped in a refractory, non-reactive container; yet owing to its high melting point, the materials suitable for use as a mold are limited in number, and for practical considerations, graphite is the only inexpensive mold material which is available for commercial use. However, boron carbide cannot be shaped by the ordinary procedure of melting the material in a graphite mold without its dissolving a substantial amount of graphite, at least in its surface portion, which will appear as parting planes of graphite between the boron carbide crystals and so render the product useless for many industrial purposes.

The primary object of this invention is to provide an accurately shaped or molded article of boron carbide having a substantially continuous crystalline structure free from parting planes of graphite and other impurities and which has the desired density and strength and is suitable for various industrial uses.

Further objects are to provide a method of and an apparatus for making such a shaped article of boron carbide which has the required chemical and physical characteristics. Other objects will be apparent in the following disclosure.

In accordance with this invention, a shaped article of boron carbide may be made by heating boron carbide of a required degree of purity, and particularly the material described in the Ridgway Patent No. 1,897,214, to a temperature at which it will melt or soften and shaping the material directly in a mold under a suitable pressure, while maintaining conditions which prevent the material from reacting chemically with or physically dissolving foreign substances capable of detrimentally affecting the properties of the shaped article. This operation is preferably carried on in the presence of an inert atmosphere or in the absence of oxygen or other materials which cause reactions or decomposition of the boron carbide. Of the available refractory materials for the mold, graphite of the purest and highest quality is preferably chosen. Owing to the ease with which molten boron carbide dissolves graphite, a special feature of this invention involves heating the material to a softened condition and causing it to be shaped while it is too viscous, or insufficiently heated, to dissolve or react with the graphite mold parts to any detrimental extent. Even if the material is fully melted, it is rapidly cooled after it has assumed its final shape, to a temperature at which the product is stable. In this way, the material is not permitted to remain in contact with graphite while in a molten state, or only for the minimum of time required for the casting operation.

In the preferred practice of this invention, boron carbide of required composition and purity is powdered to a finely divided condition, and a predetermined amount of the powder is subjected to a definite pressure while it is being heated in a graphite mold arranged within an electric resistance furnace of suitable characteristics and dimensions. The temperature and pressure are so regulated that as soon as the material has reached a softening point, which is considered to be below the melting point, or one of complete fluidity, the pressure is sufficient to consolidate the granules into an integral body of the required density and other physical characteristics. When this has been attained, the electric power is immediately shut off, but the pressure may be released or allowed to remain applied to the material as desired. It is desirable not to hold the material near its melting point, while in contact with graphite, for any longer time than necessary to effect the molding operation; and this is accomplished by cooling the body quickly through a substantial range below the melting point, as by applying cooling water to the furnace as soon as the body has been shaped and the current cut off. The cooling operation may be so controlled as to cause any desired annealing of the body and crystal formation. For some uses, the material may be melted or heat softened in a suitable furnace, and then cast in a separate mold, as required for die casting and other molding operations, but in all cases it is desirable to keep the boron carbide in a non-oxidizing atmosphere, since the heated material reacts violently with oxides and oxygen.

Experimental evidence indicates that liquefaction or softening of the boron carbide in granular condition begins at a temperature considerably below its melting point when it is subjected to a high pressure. It has been assumed, but not proved, that the applied pressure brings about localized points of slightly higher pressure density on the points and edges of the softened grains, which causes them to deform gradually into a viscous mass and until the pores have been substantially eliminated and the maximum apparent density has been attained, with the material of the particles cohering as an integral body. If coarse grains are used with the resulting large, intergranular spaces, a much larger pressure is required to produce the maximum density than when fine sizes are used. Hence, for attaining the maximum density, a particle size smaller than will be retained on a screen of 200 meshes to the linear inch is preferably used. A fixed sizing of the grains is preferable so that a definite volume-weight relationship may be had in the shaped article. If such a powder of substantially pure boron carbide is employed, the apparent density may be raised to a value substantially equal to or within 2% of the real density of boron carbide, which is about 2.52. Many satisfactory articles ranging in size from ¼ to 1½ inches in diameter have been made of a density between 2.3 and 2.52 by the application of pressures between 100 and 5000 pounds per square inch and without heating the boron carbide sufficiently to cause it to dissolve graphite to any material extent. Less dense articles may be made by suitably controlling the temperature and pressure, as will be understood.

It is desirable that a substantially pure material be employed, if the maximum density and strength are to be obtained. A satisfactory boron carbide may be made in accordance with the Ridgway patent, and care is taken to select a material which is substantially free from graphite or unreacted carbon and boric acid glass, as well as various metals, such as iron, aluminum and silicon. If desired, the material may be chemically treated to remove undesired ingredients. This treatment may comprise treating the boron carbide of the type produced according to the Ridgway patent by suitable acid reagents to remove acid-soluble impurities, and particularly by subjecting the material in a finely divided condition to the action of hydrochloric acid. The resultant product is particularly adapted for the casting or molding operation and is characterized by forming a metal-like body having a conchoidal crystalline fracture and consisting substantially of a single continuous phase of boron carbide conforming to the formula $B_4C$.

The following examples from test records show a comparison between typical analyses of the composition of the boron carbide powder before molding into the form of satisfactory articles and the composition of the formed pieces resulting from the high temperature molding process.

|  | Per cent by weight | | | | | | |
| --- | --- | --- | --- | --- | --- | --- | --- |
|  | B | C | Si | Fe | Al | Ca | MgO |
| Composition of boron carbide powder before molding | 76.5 | 20.6 | .8 | .4 | .3 | .1 | Trace. |

| Composition of pieces molded from above powder | Percent by weight | | | | | | |
| --- | --- | --- | --- | --- | --- | --- | --- |
|  | B | C | Si | Fe | Al | Ca | MgO |
| Sample No. (1) | 77.3 | 22.4 | .3 | .1 | .2 | None. | None. |
| Sample No. (2) | 77.8 | 21.0 | .7 | .3 | .2 | None. | None. |
| Sample No. (3) | 78.5 | 21.1 | .3 | Trace. | Trace. | None. | None. |

In the examples above noted, it will be seen that the high temperature molding operation used in making the molded article results in the composition taking up additional carbon with the consequent decrease of the free boron content, as compared to the ideal composition desired, and the further reduction of the small amounts of impurities, by volatilization, to insignificant quantities. In the above table, it will also be observed that the analysis of Sample No. (3) approaches closely to the ideal composition.

In the preferred practice of the invention, it has been found advantageous to employ boron carbide containing a small amount of free boron in excess of that required to make the carbide set forth in the Ridgway patent. It may be assumed that this excess of boron metal will act to neutralize or react with the carbon vapors resulting from the carbon mold or related parts. It is, however, desirable to maintain an exact composition of the material, since this will determine the physico-chemical structure of the molded body.

As above indicated, it is desirable to maintain the temperature of the material below its melting point during the casting operation, or to prevent the material from remaining in a molten condition for any greater length of time than necessary to permit shaping the article. To measure and control these high temperatures, various types of apparatus may be employed. We prefer to observe the temperature by means of an optical pyrometer suitably located in the furnace, and to control the electric current and the pressure by manually operable devices to effect the desired results. We have observed that the final temperature is directly related to the pressure, and that upon releasing the pressure, the softened material will again solidify. Consequently, the molding temperature may be varied by making corresponding changes in the pressure conditions, and articles of required densities may be produced without allowing the temperature to approach too closely the point at which graphite is dissolved materially. It is also feasible, when the material is molded by the pressure of a movable plunger, to employ the motion of the plunger itself for determining when the molding operation has been completed and when the maximum temperature required has been obtained. For example, when the plunger movement indicates that the material has been compacted to the required density, the temperature may be immediately lowered to a point at which the boron carbide may safely lie in contact with the graphite mold without dissolving any of the carbon and to effect the required crystallization and solidification of the boron carbide.

One form of apparatus which is adapted for making such articles is illustrated in the accompanying drawing, in which:

Fig. 1 is a vertical section, with parts broken away, of an electric furnace and mold arranged for forming a hollow, cylindrical or tubular body of boron carbide;

Fig. 2 is an enlarged detail, partly in section, of the graphite mold parts shown in Fig. 1;

Fig. 3 is a detail similar to Fig. 2, showing the arrangement of the mold parts for producing a solid body of cylindrical or other shape; and Fig. 4 shows curves which indicate the relationship of the plunger movement to the temperature of the boron carbide.

The construction employed for making boron carbide articles preferably comprises a resistance furnace having a resistor of suitable material and electrical characteristics for obtaining the required temperature. This resistor is a hollow tube, and the refractory mold parts required for shaping the boron carbide articles are inserted within the central heated space of the tube so as to be subjected to the maximum heat within the furnace. One or more plungers of refractory material likewise extend within the hollow resistor and serve for consolidating the boron carbide granules.

In the embodiment illustrated in Fig. 1, the furnace comprises a cylindrical iron shell 10 of suitable dimensions which with metal end walls 12 forms a heat-insulating and protective casing for the resistor and mold parts. The cylindrical shell has end flanges 13 which are bolted or otherwise secured to the walls 12, but the shell is insulated from the end walls by suitable insulating rings 14 therebetween. A stream of water may be applied through the tube 15 or other suitable device for cooling the shell of the furnace and the ends of the resistor. A pipe 16 fastened to the upper portion of the shell 10 serves for the introduction of insulating material and the exit of gases generated or expanding therein. An optical pyrometer may be suitably located within this pipe, or it may be otherwise incorporated in the apparatus.

In order to form a proper support for a graphite resistor tube 20, the end plates 12 are each made integral with a cylindrical sleeve 21, which in turn is fastened to an upright flange 22 forming spool-like ends. The sleeves 21 serve as bearing supports for the graphite resistor 20, while the flanges 22, together with the flanges 13, prevent water from contacting with the electric terminals. The graphite resistor 20 projects outwardly beyond the sleeve 21 and has fastened at its opposite ends the water-cooled terminals 23 to which are connected the lead-in cables 24 for supplying electric current thereto. Except as herein described, the various parts of this furnace may be made in accordance with standard construction, as is well known in the art. It will, for example, be appreciated that the dimensions of the resistor rod 20 will be determined in accordance with the temperature requirements of the furnace. For instance, a load of 12 kilowatts is required in a small furnace for making a boron carbide article of the sizes herein specified.

The hollow graphite resistor rod 20 is surrounded by a mass of pulverulent lamp black or other suitable material, which is fed into the furnace as required through the tube 18. This material being of the same chemical nature as the graphite resistor 20 serves to surround the resistor rod with an inert environment and to prevent the tube 20 from being oxidized. Any air entrapped therein will be converted to non-oxidizing gases.

This invention contemplates placing a definite, weighed amount of boron carbide powder of required granular size in a mold of predetermined dimensions and compressing the same until it has assumed the required density. While various mold constructions may be employed within the scope of this invention and as are required for shaping the different types of articles, the forms shown in Figs. 2 and 3 are typical of mold constructions which are serviceable in this type of furnace. As there shown, the resistor 20 has a cylindrical inner surface of accurate dimensions, and it is so arranged that the mold parts may be slidably mounted therein. The resistor and the mold parts are preferably made of the best available graphite material, of the so-called "extra quality" which is strong and has been processed to a maximum density, such as is used for electric furnace electrodes. This material is substantially pure carbon, with only negligible amounts of ash constituents. It is capable of being machined to accurate dimensions.

The mold shown in Fig. 2, and on a smaller scale in Fig. 1, is serviceable for making a hollow, cylindrical article from a mass of boron carbide powder 30. This mold comprises a cylindrical sleeve 31 and a cylindrical core 32 of graphite, together with ring-shaped end walls 33 which are slidably mounted within the sleeve 31. The mold space formed by the sleeve 31, the core 32 and the rings 33 serves to contain the boron carbide granules 30 and defines the shape of the compacted article. The rings 33 fit loosely within the sleeve 31 and accurately and tightly around the highly polished core 32 and serve as a compression packing which lessens the strain on the central core. They also prevent the boron carbide in its softened condition from escaping from the mold chamber. In order to apply pressure to the boron carbide granules as they are being heated, one or more plungers, which are likewise made of refractory material, and preferably graphite, are fitted for sliding movement within the resistor 20. Two plungers 35 and 36 are illustrated, one of which may be stationary and the other movable, or both may be movable. Improved results are obtained by pressing the powder from both ends. The left-hand plunger 35 is shown in Fig. 1 as mounted merely for adjustable movement within the resistor 20, which is accomplished by the screw 37 in the framework 38. This adjustment serves to locate the boron carbide material within the hottest zone of the furnace, as determined by the size of the article to be formed.

In order that the movement of the plungers may be properly transmitted to the boron carbide granules 30 in the mold space, it is preferable to employ intermediate plunger blocks 39, each of which is engaged by the inner ends of one of the plungers and is provided with a recess 40 which fits loosely over the ends of the core 32 projecting through the disk 33 and thus slides thereon. These blocks fit accurately and tightly within the sleeve 31, hence cooperate with the rings 33 to confine the boron carbide within the mold space. Consequently, pressure applied to the plungers 35 and 36, as indicated in Fig. 1, will cause the blocks 39 to force the rings 33 towards each other and thus compact the boron carbide granules therebetween. These members 33 and 39 are herein considered as associated parts of the plungers.

If a solid body is to be made, then the construction shown in Fig. 3 may be employed, which is generally similar to that of Fig. 2. In this case, the resistor 20 has fitted therein the slidable plunger members 42, and these engage the blocks 43 of suitable shape, which fit accurately within the ends of the sleeve 44 and thus form a mold chamber. Surrounding the sleeve 44 is a further sleeve 45 which in turn is removably mounted within the resistor rod 20. It will be appreciated that these parts are so made as to permit removability of the shaped boron carbide article, as well as replacement of the mold parts at the minimum of expense. With this arrangement of parts, the plungers 42 will move the plunger blocks 43 inwardly and apply end pressure to the boron carbide particles and compress them within the mold chamber 46.

The application of a measured pressure and the indication of the movement of the plungers is effected, as shown in Fig. 1, by means of a lever arm 50 carrying a suitable weight 51. The lever is fulcrumed on a pin 52 mounted on the framework 38 and has an arm 53 which in turn applies pressure to the right-hand plunger 36 through an intermediate insulating member 55 resting against the end of the graphite plunger. A further insulating block 56 may be placed between the plunger 35 and the screw 37. It will be observed that the plunger 36 has a considerable sliding contact with the inner surface of the resistor 20, but it may be reduced in cross-section, as at 57, in order to cut down the sliding resistance. In order to observe the movement of the plunger, a pointer 58 forms an extension of the lever arm 50 and rides over a suitably graduated scale 59 mounted on the frame. The parts are so arranged that the furnace operator may watch the movement of the scale pointer 58 and stop the electric current flow when the pointer indicates the proper temperature and pressure conditions.

In the operation of this furnace and the manufacture of a molded boron carbide article, the exact conditions will be determined by the nature of the material used and the size and density of the finished product. In the manufacture of a small article, such as is employed in a sand blast nozzle or a wire drawing die, which is of comparatively small dimensions but is required to be of the maximum obtainable density and to be accurately dimensioned, it is preferable to make the article in accordance with the following procedure. Boron carbide of a high degree of purity, and preferably that type of material which is obtained in accordance with the process set forth in the Ridgway Patent No. 1,897,214 and treated with acid as above described, is crushed to a suitable size, and preferably one which is finer than will be retained by a screen of 200 meshes to the linear inch. The material may comprise a mixture of coarse and fine sizes so as to give the maximum apparent density to avoid large plunger movements. A definite weighed amount of this material, as predetermined by suitable calculations, is placed in the mold cavity (Fig. 2) formed by the sleeve 31, one of the rings 33 and the core 32, after which the other ring 33 is assembled on the core and the parts are slidably mounted within the resistor 20. Then, the plunger rods 35 and 36 and the blocks 39 are properly assembled in place. The material may be preliminarily pressed to shape in the mold or prior to its being placed in the mold, so that it will have an apparent density of about 2.0, thus lessening the plunger movement and otherwise improving the casting operation. Upon the application of electric current of suitable voltage and amperage, the resistor rod 20 and associated parts will be rapidly heated to the required temperature. If desired, the plunger movement may be so controlled that a definite amount or weight of grains, which has been calculated to occupy a desired volume percentage of the final product, will be caused to occupy that volume in the shaped body, so that the porosity will likewise constitute a desired volume. The plunger may be restrained in its movement by any suitable device arranged for the purpose.

The pressure to be applied by the weight 51 will be determined in accordance with the size and desired density of the article to be made. For example, in making a sand blasting nozzle, the pressure limits may be maintained within a range of from 1000 lbs. to 5000 lbs. per sq. in. to produce articles of the highest quality. For a tube $2\frac{3}{16}$ inches long, with an outside diameter of ⅞ inch and a core diameter of $\frac{3}{16}$ inch, a pressure of 3000 lbs. per sq. in. has been found to be satisfactory and will form a completed article with a density greater than 2.4, when the maximum temperature reached in the formation of this piece was approximately 2350° C.

As above stated, the movement of the plunger may be employed to indicate the condition of the boron carbide while it is being compacted and as a temperature measurement. This is illustrated in Fig. 4 which shows two curves, the lower curve "a" representing the movement of the plunger in a definite time interval while the other curve "b" represents the approximate temperature attained by the boron carbide during a particular casting operation. As shown by the curves, it will be observed that the plunger moves inwardly very slowly at first and until the temperature has nearly reached a maximum, after which it moves rapidly to compact the material. There-after, the plunger moves but slowly while the temperature increases slightly or remains substantially stationary. If it is desired to obtain a maximum density of the article, then the heating may be kept up until the plunger has become substantially stationary, as indicated by the dotted line "c". Then, the heating current may be cut off. At this point of maximum density "c", the temperature, as measured by optical instruments, reached the point of approximately 2300° C., or possibly the melting point of the boron carbide. It will now be appreciated that to effect a very delicate control of the temperature and pressure compacting of the boron carbide article, one watches the movement of the plunger or the pointer 58 and when the plunger movement is slowing up or has practically stopped, he may cut off the current and cool the furnace rapidly by the water stream, and so not permit the boron carbide to be further heated and approach more closely to its melting point or to remain molten for any considerable length of time. Whether or not these curves indicate that the boron carbide has become entirely transformed to the liquid phase cannot be stated. It, however, is to be observed that the temperature curve has a slight upward slope, thus indicating that the material has not yet reached a molten condition. However, one may so control the length of the heat softening and compacting period as to keep the boron carbide from contacting with the graphite mold any longer than necessary while it is in a molten condition; and, if desired, the pressure casting operation may be stopped at a point short of that at which the material has become fully molten, as determined by the movement of the plunger. This affords a delicate control of the process. The degree of pressure applied as well as the grit size used will determine the density of the article. The pressure limits will, of course, be governed largely by the strength of the mold and furnace materials.

The body thus formed has a purity in excess of 99% of $B_4C$, and it is believed to be made up of a substantially continuous phase of boron carbide, which is substantially free from any cementing material of a low degree of hardness. The body has a conchoidal crystalline fracture and freedom from any material amount of graphite and other undesired impurities, and it appears to be similar to the boron carbide material as originally made in the electric furnace in accordance with said Ridgway patent. If a density of 2.3 or greater has been attained, the body is of metal-like appearance capable of taking a high polish, and its modulus of rupture in compression is in excess of 100,000 lbs. per sq. in. If it is desired to manufacture a porous or spongy article, then a coarser granular material may be used, and the pressure and temperature conditions will be so controlled as to cause these larger granules to knit together at their points of contact, but to leave a desired pore volume therebetween.

It is to be understood that this method of manufacture and the articles obtained thereby may be made of boron carbide obtained by any suitable process of manufacture and of any suitable composition, and whether or not the boron carbide in the shaped product contains an excess of either boron or carbon over that represented by any particular chemical formula. Also, the expression "single continuous phase" as found herein is not intended to limit this case to any particular theory of formation of the body, nor as to the physical condition of the product. It is immaterial in so far as the broader aspects of this invention are concerned whether the individual grains have melted completely during the pressure casting operation and then have crystallized into a single homogeneous body, or whether the individual crystalline grains have not been wholly melted but have been merely softened and molded together into an integral body. The expression is, however, intended to cover a body which is substantially devoid of parting planes of graphite and of any large amount of other impurities which can seriously interfere with the homogeneity and integrality of the body and with its functions for the purposes intended. The body, as thus formed, is made up substantially wholly of boron carbide, depending upon the degree of purity of the material initially employed.

Having thus described the invention, what is claimed as new and desired to secure by Letters Patent is:

1. The method of making a shaped article of boron carbide comprising the steps of heating boron carbide granules in a netral environment to a temperature at which they will cohere under pressure, pressing the grains in a carbon mold to shape the article and preventing the boron carbide from remaining in a molten condition in contact with the mold and dissolving a material amount of carbon therefrom, thereby forming an article of boron carbide having a conchoidal crystalline fracture which appears substantially as a single phase free from parting planes of graphite.

2. The method of making a shaped article of boron carbide comprising the steps of heating granular boron carbide under pressure in a graphite mold to a temperature at which the grains will cohere and immediately lowering the temperature, as soon as the desired density has been attained, to a point at which the boron carbide will not dissolve carbon and forming a body which is substantially free from parting planes of graphite.

3. The method of making a shaped article of boron carbide comprising the steps of providing a pulverulent mass of substantially pure boron carbide of a composition conforming substantially to the molecular formula $B_4C$, heating the material to a softening temperature and pressing it in a mold to the desired density while preventing contamination thereof, thereby forming a solid body having a substantially continuous phase of boron carbide.

4. The method of making a shaped article of boron carbide comprising the steps of providing a pulverulent mass of substantially pure boron carbide of a composition conforming substantially to the molecular formula $B_4C$ and containing a small amount of excess boron, heating the material to a softening temperature and pressing it in a graphite mold to the desired density, thereby forming a solid body having a substantially continuous phase of boron carbide.

5. The method of claim 3 in which the mold is made of graphite and the temperature of the material is lowered as soon as it has been compressed to the required density, so that the boron carbide will not remain in a molten condition in contact with carbon and dissolve a material amount thereof and the molded body will be substantially free from parting planes of graphite.

6. The method of making a shaped article of boron carbide according to claim 3 comprising the steps of crushing purified boron carbide to a size finer than will be retained on a screen of 200 meshes to the linear inch, placing a precalculated weight of the grains in a mold of predetermined dimensions and consolidating the material by heat and pressure to a density above 2.3 and approaching 2.52.

7. The method of shaping an article of boron carbide comprising the steps of selecting the required grit sizes of boron carbide as determined by the characteristics of the final product, subjecting the granular material to a high pressure within a mold comprising material capable of affecting the purity of the boron carbide during the heating operation and simultaneously heating it to a point at which, under the imposed pressure, the grains will become consolidated to a body of required density, while maintaining the boron carbide at a temperature below that at which contamination will take place and then cooling the mold and body rapidly and thereby preventing the boron carbide from reacting with or dissolving a material amount of impurities.

8. The method of making a shaped article of boron carbide comprising the steps of treating granular boron carbide with hydrochloric acid to remove acid soluble impurities, electrically heating it in a graphite mold while subjecting it to a high pressure and immediately lowering the temperature, as soon as the desired density has been attained, to a point at which the boron carbide cannot dissolve carbon and thereby forming a body of a substantially continuous phase of boron carbide which is free from parting planes of graphite.

9. The method of making a porous, shaped article of boron carbide comprising the steps of selecting grains of boron carbide of a composition conforming substantially to the molecular formula $B_4C$ and of a required grit size and purity, placing a precalculated amount of the grains in a mold of predetermined dimensions, heating the material to the softening point and compressing the heated grains to the required density and causing them to cohere into a porous body, the percentage of porosity of which is determined by the volume into which the material is compacted.

10. The method of shaping an article of boron carbide comprising the steps of placing a granular mass of boron carbide within a mold having a movable compression plunger, said mold comprising material capable of affecting the purity of the boron carbide at a high temperature, heating the mold and boron carbide to a high temperature while applying pressure to the plunger to consolidate the mass and immediately cooling the mold when the plunger movement indicates that the material has been compressed to the required density and thereby minimizing contamination of the boron carbide.

11. The method according to claim 10 in which the mold is made of graphite and the plunger movement serves to indicate the temperature of the material, characterized by cooling the material before it has remained in a molten condition in contact with the graphite mold and dissolved a material amount of carbon therefrom, thereby forming a shaped article substantially free from parting planes of graphite.

12. A shaped article of boron carbide characterized by a substantially continuous phase of boron carbide having a composition conforming substantially to the formula $B_4C$ which has been molded to the required dimensions and shape.

13. A shaped article of boron carbide characterized by a substantially continuous phase of boron carbide having a composition conforming substantially to the formula $B_4C$ which has been molded to the required dimensions and shape and is substantially free from parting planes of graphite and structure weakening impurities.

14. A shaped article of boron carbide characterized by a substantially continuous phase of boron carbide having a composition conforming substantially to the formula $B_4C$ which has been molded to the required dimensions and shape and is substantially free from parting planes of graphite and structure weakening impurities, said article having a density between 2.4 and 2.52 and a modulus of rupture in compression in excess of 100,000 lbs. per sq. in. and is capable of taking a high polish.

15. A porous article of boron carbide comprising grains of boron carbide of a composition conforming substantially to the molecular formula $B_4C$ and of required grit size which are substantially free from graphite, said grains being self-bonded by heat softening and compression into an integral porous structure in which the pores comprise a substantial portion of the total volume, the percentage of which is determined by the sizes of the grains and the degree of compression applied to the softened mass.

RAYMOND R. RIDGWAY.
BRUCE L. BAILEY.